(12) United States Patent
Hsu

(10) Patent No.: US 7,246,858 B2
(45) Date of Patent: Jul. 24, 2007

(54) STRUCTURE TO ADJUST A SEAT BACK

(76) Inventor: Long-Chuan Hsu, No. 39, Sha Luen, Chung Sha Vill., An Din Hsiang, Tainan Hsien (TW)

( * ) Notice: Subject to any disclaimer, the term of this patent is extended or adjusted under 35 U.S.C. 154(b) by 59 days.

(21) Appl. No.: 11/183,788

(22) Filed: Jul. 19, 2005

(65) Prior Publication Data
US 2007/0029856 A1 Feb. 8, 2007

(51) Int. Cl.
*B60N 2/02* (2006.01)
(52) U.S. Cl. ............. 297/362.12; 297/362; 297/361.1; 297/362.14
(58) Field of Classification Search ........... 297/362, 297/361.1, 361.14, 361.12, 362.1, 362.12, 297/362.14; 74/89.14, 425
See application file for complete search history.

(56) References Cited

U.S. PATENT DOCUMENTS

| | | | | |
|---|---|---|---|---|
| 4,685,735 A | * | 8/1987 | McFalls et al. ............. 297/362 |
| 5,295,730 A | * | 3/1994 | Rees ........................ 297/361.1 |
| 5,887,353 A | * | 3/1999 | Beckingham ................. 33/292 |
| 5,997,089 A | * | 12/1999 | Kawasaki ............... 297/362.14 |
| 6,039,398 A | * | 3/2000 | Gorgi et al. ............. 297/354.1 |
| 6,076,266 A | * | 6/2000 | Beckingham et al. ......... 33/292 |
| 6,520,582 B2 | * | 2/2003 | Glance ................... 297/362.14 |
| 6,712,430 B2 | * | 3/2004 | Ito et al. ...................... 297/362 |
| 6,764,136 B2 | * | 7/2004 | Sakamoto .............. 297/362.14 |
| 2004/0135415 A1 | * | 7/2004 | Sakamoto ................ 297/361.1 |

* cited by examiner

*Primary Examiner*—David Dunn
*Assistant Examiner*—Erika Garrett
(74) *Attorney, Agent, or Firm*—Rosenberg, Klein & Lee

(57) ABSTRACT

A structure to adjust a seat back includes a seat base, a seat back, an adjusting device and a linking rod. The seat back comprises a seat back support pivotally connected to the seat base. The adjusting device includes a worm, a worm wheel and a bracket. The bracket is secured to the seat base opposite the seat back. The worm is pivotally connected to the bracket. The worm wheel is pivotally connected to the bracket and meshes with the worm. The linking rod has one end pivotally connected to the seat back support and another end connected to the worm wheel. By operating the worm, the worm wheel is linked to spin, which links the linking rod to move to adjust the seat back.

4 Claims, 5 Drawing Sheets

STRUCTURE TO ADJUST A SEAT BACK

BACKGROUND OF THE INVENTION

1. Field of the Invention

This invention relates to a structure to adjust a seat back, and more particularly to one applied to an exercising apparatus, which uses a worm and a worm wheel to adjust a seat back.

2. Description of the Prior Art

A conventional seat of an exercising apparatus is provided with an adjustable seat back. The adjustment is done by operating a pneumatic device underneath the seat pad, and is adjusted by a handle to inflate or to release air. Once the adjustment is done, the pneumatic device is locked to set the seat back at a secured inclining position.

However, the air pumps in a fast speed. Sometimes an operator can hardly control the seat back to the most appropriate position, so they have to do the adjustment continuously or give up after several tries.

SUMMARY OF THE INVENTION

It is the primary object of the present invention to provide a structure to adjust a seat back, which is easy to operate and is cost-effective.

It is another object of the present invention to provide a structure to adjust a seat back, which can prevent the seat back from sliding or moving randomly through an adjusting device.

It is a further object of the present invention to provide a structure to adjust a seat back, which can make a precise and stepless adjustment to reach a best position for a user.

To achieve the above-mentioned objects, the present invention comprises:

a seat base;

a seat back, the seat back comprising a seat back support pivotally connected to the seat base;

an adjusting device, the adjusting device comprising a worm, a worm wheel and a bracket, the bracket being secured to the seat base opposite the seat back for the worm to extend there through, the worm wheel being pivotally connected to the bracket and meshing with the worm;

a linking rod, the linking rod having one end pivotally connected to the seat back support and another end connected to the worm wheel.

The present invention further comprises an extension rod. The extension rod has one end secured to the worm wheel and another end pivotally connected to the linking rod.

The bracket of the adjusting device comprises a fixture to position the worm in place.

The worm comprises a knob exposing outward from the bracket to control the worm.

DETAILED DESCRIPTION OF THE PREFERRED EMBODIMENT

Figure 1:
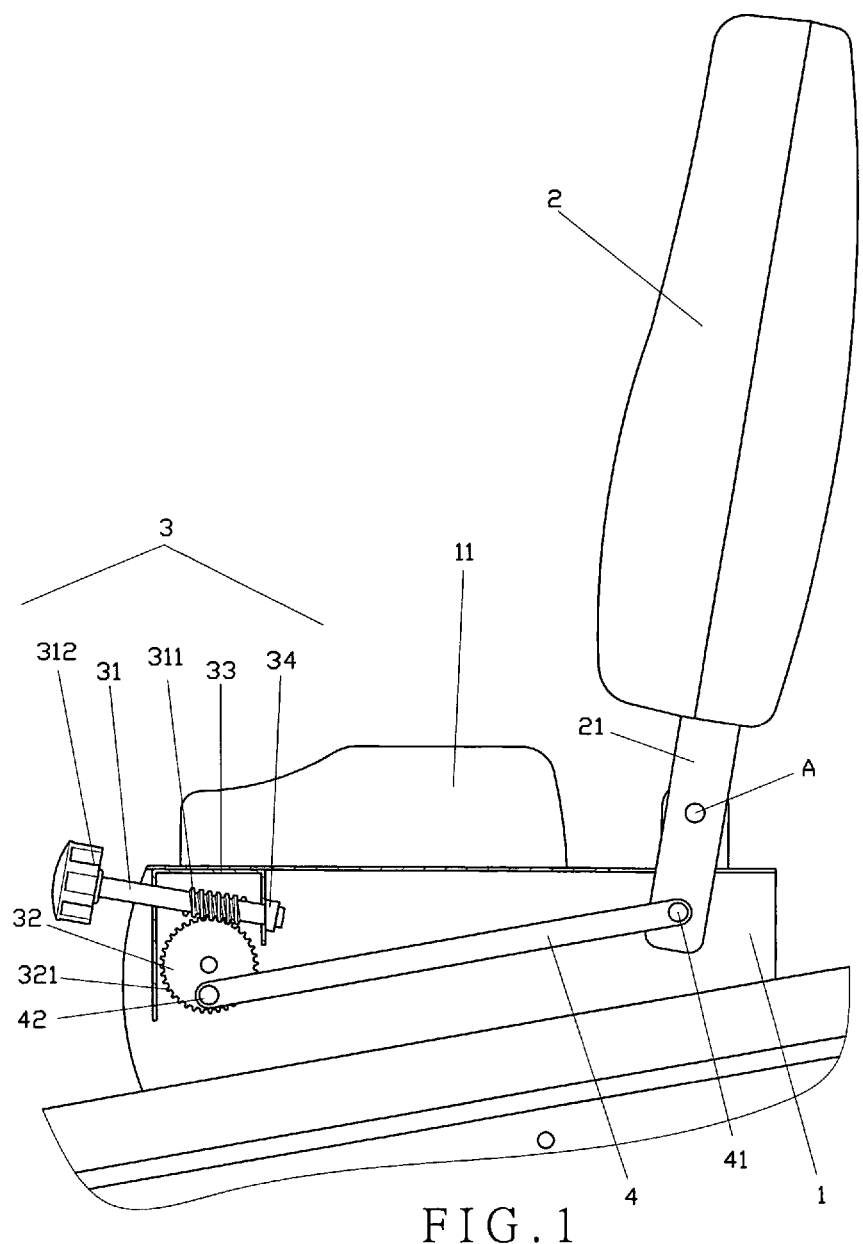
FIG. 1 is a side view of a chair incorporated with the present invention, with partial sectioned.
Figure 2:
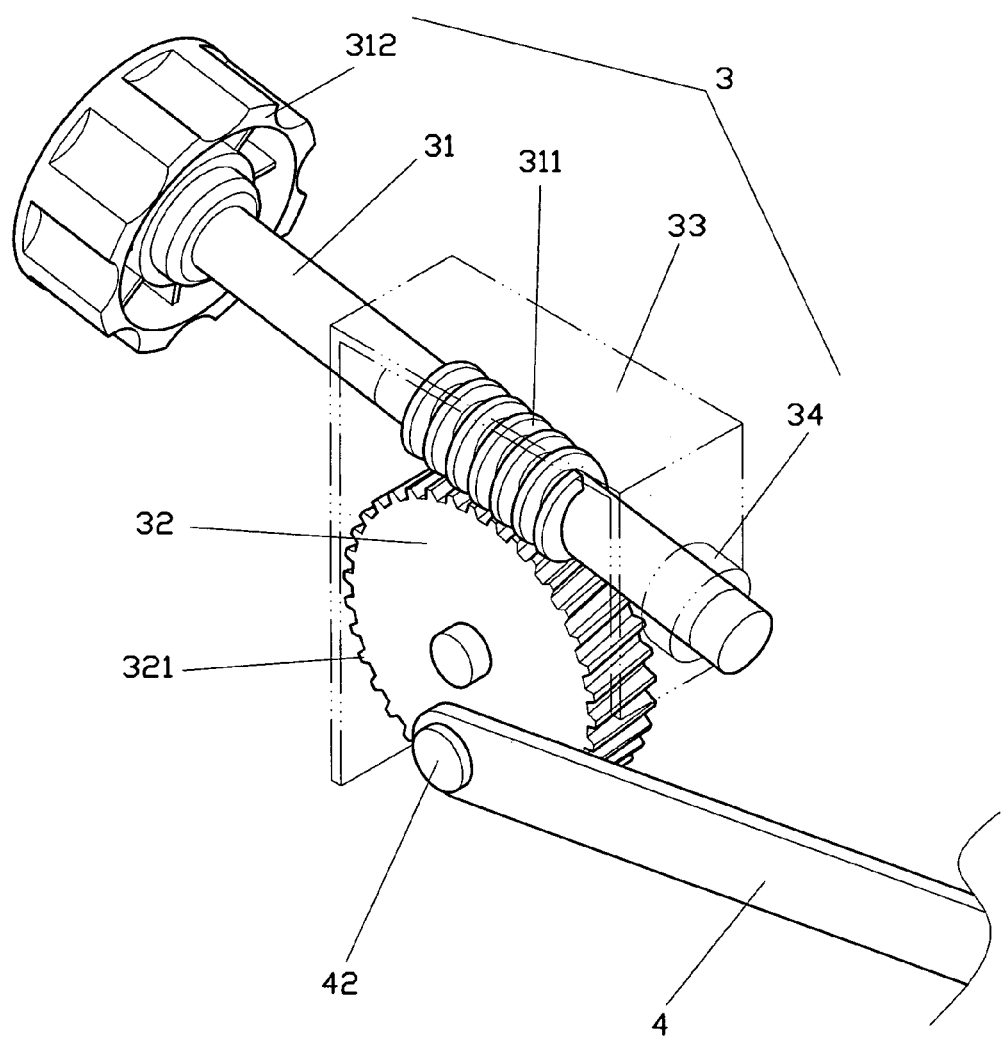
FIG. 2 is an enlarged view of an adjusting device of the present invention.

As shown in FIGS. 1 and 2, a first preferred embodiment of the present invention comprises a seat base 1, a seat back 2, an adjusting device 3, and a linking rod 4.

A seat 11 is provided on the seat base 1.

The seat back 2 comprises a seat back support 21 pivotally connected to the seat base 1 to form a pivoting point A. The seat back support 21 extends a portion downward to the bottom of the seat base 1.

The adjusting device 3 comprises a worm 31, a worm wheel 32 and a bracket 33. The bracket 33 is disposed at the bottom of the seat base 1 opposite the seat back 2. The worm 31 is inserted through the bracket 33 at a slanting angle. The worm 31 comprises spiral teeth 311 thereon and has one end protruding through a fixture 34 as a secure way to position the worm 31 in place. The fixture 34 may be a retainer, a pin or any device that can hold the worm 31 in place. The worm 31 has another end extending outward from the bracket 33 with a knob 312 at the endmost as a control to rotate the worm 31. The worm wheel 32 is formed with teeth 321 around its edge to mesh with the spiral teeth 311 of the worm 31.

The linking rod 4 has one end 41 pivotally connected to the seat back support 21 at the bottom of the seat base 1 and another end 42 pivotally connected to the worm wheel 32.

Figure 3:
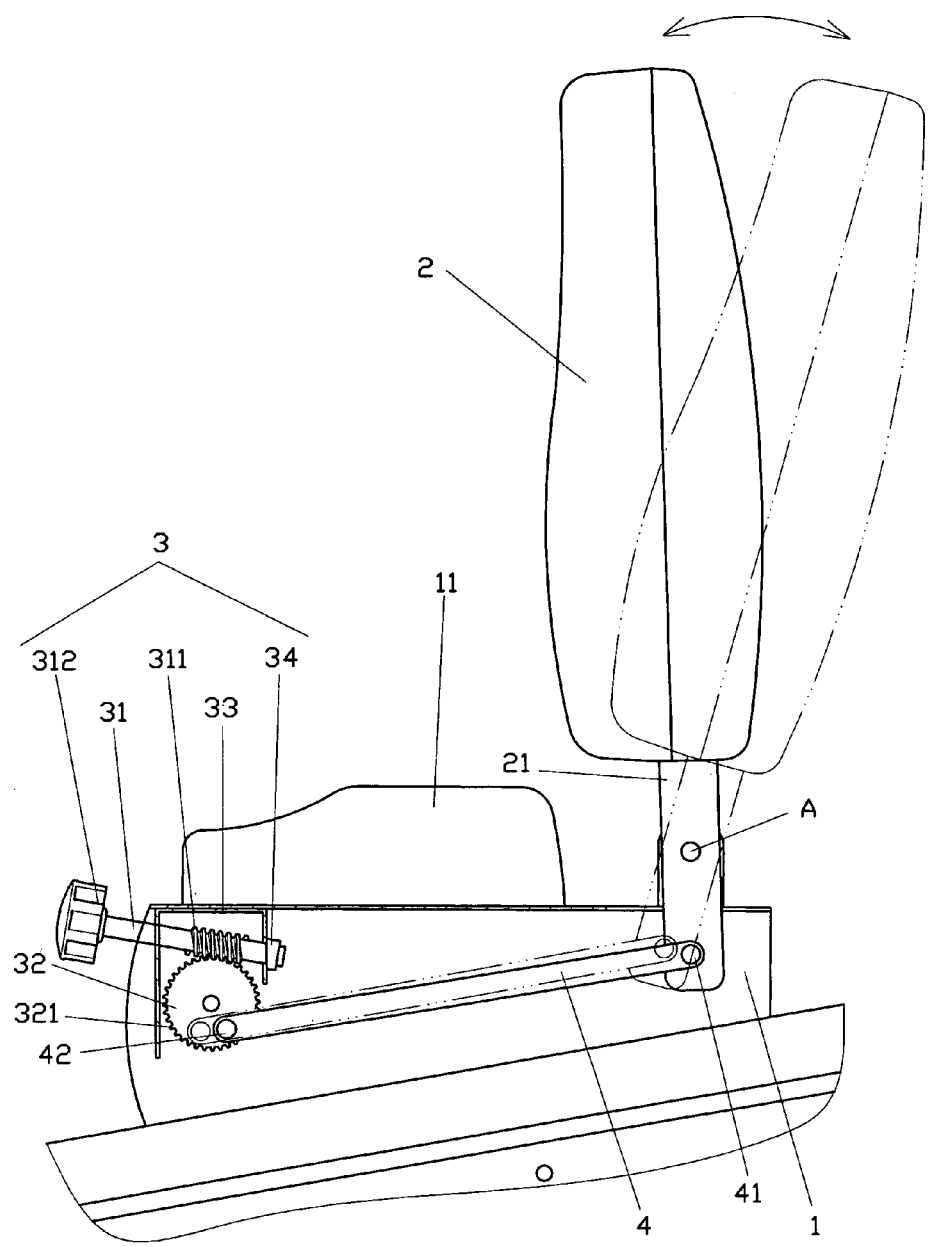
FIG. 3 is a side view of the present invention in an operating status.

To operate the present invention, as shown in FIG. 3, a user can operate the knob 312 to spin the worm 31 and the spiral teeth 311, which links the worm wheel 32 to spin simultaneously. By the spinning of the worm wheel 32, the linking rod 4 is linked to move transversely to change the position of the seat back support 21 either forward or rearward.

The spiral teeth 311 of the worm 31 are limited, which takes less strength to turn the worm 31. Due to the fact of the ratio of the spiral teeth 311 and the teeth 321, the worm wheel 32 is linked to move gradually to adjust the angle of the seat back 2 to make a stepless adjustment.

Upon the seat back support 21 reaches to a desired angle in relation to the seat base 1, the worm wheel 32 and the worm 31 produces a reverse function to stop the seat back support 21 from moving reversely. When the seat back 2 is pulled or pushed manually, the linking rod 4 will not move through the seat back support 21 to spin the worm wheel 32 and worm 31.

Figure 4:
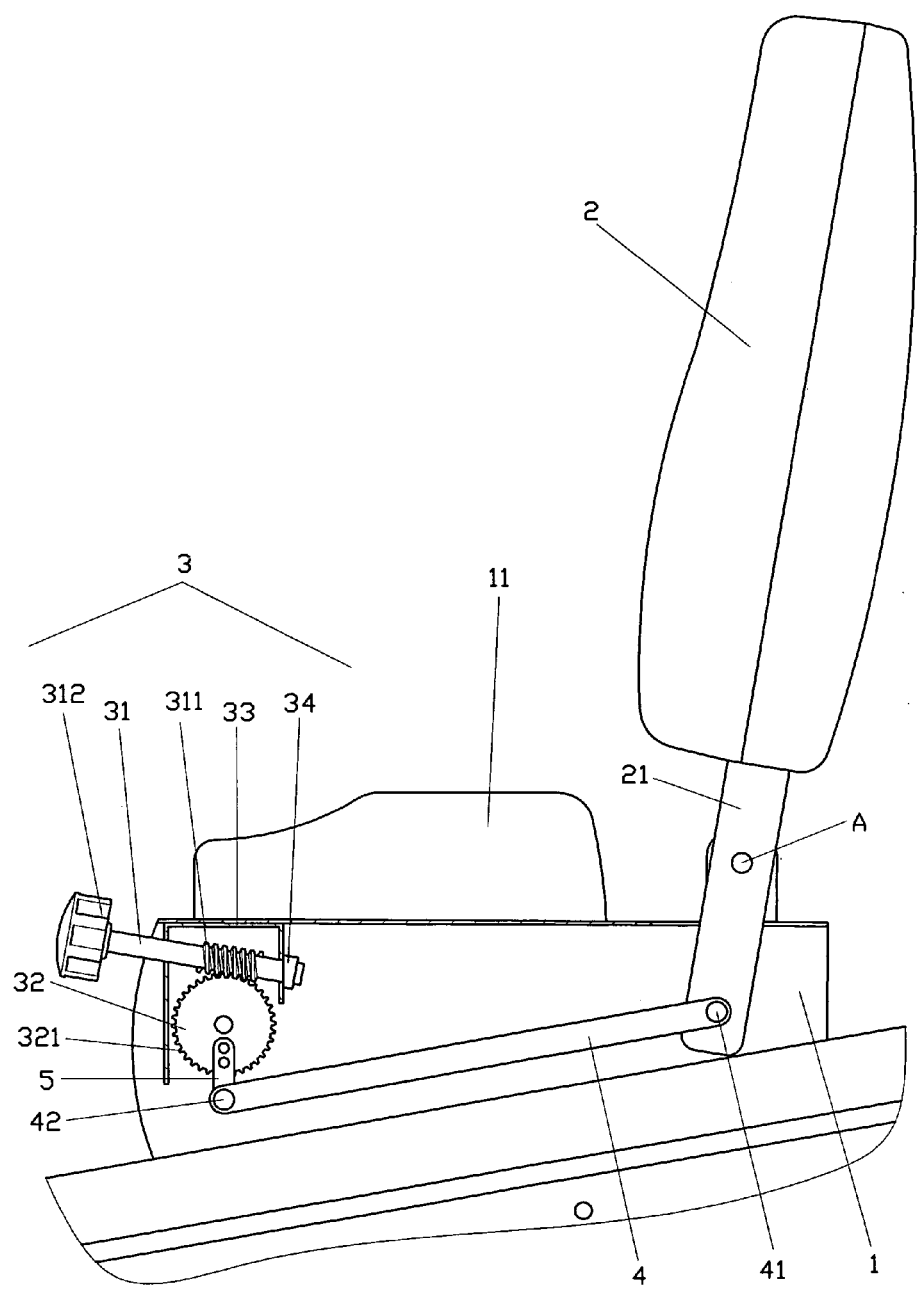
FIG. 4 is a side view of a second embodiment of the present invention.

As shown in FIG. 4, a second embodiment of the present invention comprises all of the above-mentioned parts and an extension rod 5. The extension rod 5 has one end secured to the worm wheel 32 and another end pivotally connected to the linking rod 4. The linking rod 4 has the end 41 pivotally connected to the seat back support 21 and the other end 42 pivotally connected to the extension rod 5.

To adjust the angle of the seat back 2, the user may turn the knob 312 of the worm 31, which links the spiral teeth 311 of the worm 31 and the worm wheel 32 to turn. The extension rod 5 and the linking rod 4 are linked to move simultaneously, while the seat back support 21 will also move along with the linking rod 4 to change the angle of the seat back 2 in relation to the seat base 1.

Figure 5:
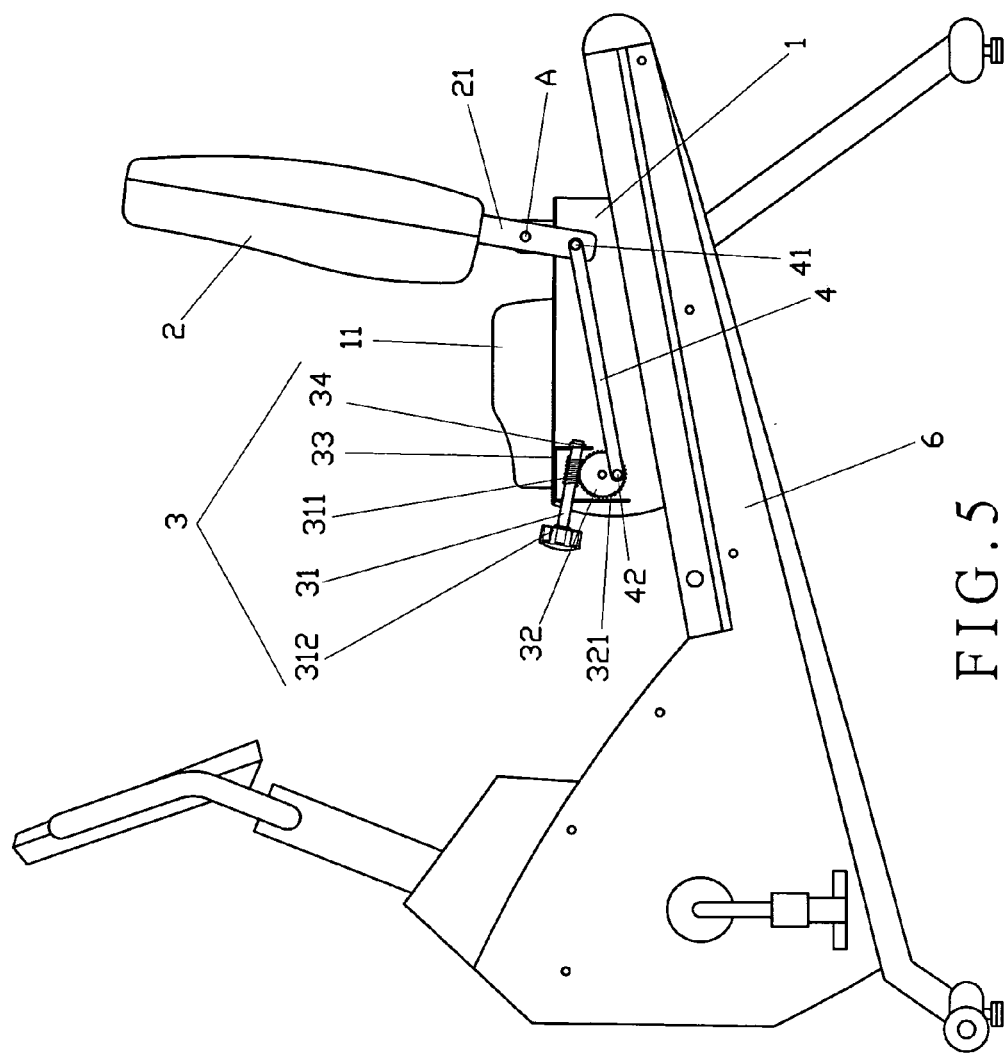
FIG. 5 is a side view showing the present invention applied to an exercising apparatus.

This design fits not only for an ordinary chair, but also for an exercising apparatus 6, as shown in FIG. 5. By adjusting the knob 312 extending outward from the seat base 1 to rotate the worm 31 and the worm wheel 32. The linking rod 4 is linked to move, while the seat back support 21 is linked to move along with the linking rod 4 to change the angle of the seat back 2 in relation to the seat base 1.

I claim:

1. A structure to adjust a seat back comprising:
   a seat base;
   a seat back, said seat back comprising a seat back support pivotally connected to said seat base;
   an adjusting device for pivotally adjusting the seat back with respect to said seat base, said adjusting device comprising a worm, a worm wheel and a bracket, said worm having a knob at an end thereof, said bracket being secured to said seat base opposite said seat back for said worm to extend there through, said worm wheel being matingly engaged to a portion of said worm;
   a linking rod, said linking rod having one end pivotally connected to said seat back support and another end connected to said worm wheel of said adjusting device, wherein rotational displacement of said knob results in responsive rotational displacement of said worm wheel and responsive displacement of said linking rod.

2. The structure to adjust a seat back, as recited in claim 1, further comprising an extension rod, said extension rod having one end secured to said worm wheel and another end pivotally connected to said linking rod.

3. The structure to adjust a seat back, as recited in claim 1, wherein said bracket of said adjusting device is provided with a fixture to position said worm in place.

4. The structure to adjust a seat back, as recited in claim 1, wherein said a knob is positioned outward from said bracket to control said worm.

* * * * *